United States Patent Office

Re. 28,014
Reissued May 21, 1974

28,014

METHOD FOR DRY CLEANING

Herman Knieriem, Jr., Ballwin, Mo., assignor to The Dow Chemical Co., Midland, Mich.

No Drawing. Original No. 3,482,928, dated Dec. 9, 1969, Ser. No. 680,054, Nov. 2, 1967, which is a continuation-in-part of abandoned applications Ser. No. 296,430, July 22, 1963, and Ser. No. 395,043, Sept. 8, 1964. Application for reissue Aug. 5, 1971, Ser. No. 169,558
Int. Cl. D06f *43/108*
U.S. Cl. 8—142 3 Claims

Matter enclosed in heavy brackets [ ] appears in the original patent but forms no part of this reissue specification; matter printed in italics indicates the additions made by reissue.

ABSTRACT OF THE DISCLOSURE

In a method for dry cleaning wherein a dry cleaning solvent containing detergent, hand agents and acidity control agents is employed to wash articles, the solvent and its additives are filtered and periodically distilled to remove contaminates such as dirt particles, dyes, fatty acids, and wherein the additives are depleted during the cleaning of the article, the filtration and the distillation, the improvement which comprises initially employing a solvent compositions which contains the necessary ingredients to clean articles, maintain the acidity of the solvent at a level to prevent odor and permit withdrawal of the articles with a desirable hand; filtering the solvent composition; periodically distilling at least about five percent of the solvent in the system and returning additive-free solvent to the process; and adding the same solvent composition to the process when make-up is required; the result being to maintain by a single periodic addition all of the necessary ingredients to provide a uniform efficacious cleaning of articles.

This application is a continuation-in-part of my copending application Serial No. 395,043, filed September 8, 1964, for Sweet Dry Cleaning Solvents, now abandoned, and copending application Serial No. 296,430, filed July 22, 1963, for Non-Aqueous Surfactant System, now abandoned.

BACKGROUND OF THE INVENTION

The art of cleaning articles by washing the article in a non-aqueous solvent is old and well documented in the literature. Many advances have been made in the mechanical apparatus used by the dry cleaning industry and a good number of these advances have been worthy of the grant of a patent. Generally, a dry cleaning process as employed in a modern day plant comprises a wash machine into which solvent is pumped and which contains the solvent during the cleaning cycle. Inside the machine is a wash-wheel which holds the articles to be cleaned and when it relates, repeatedly brings the article through the solvent contained in the machine. Associated with the machine, by piping, is a storage tank into which solvent can be pumped to or drained from the wash machine. Most modern day plants have a filter incorporated in the line between the machine and storage tank which removes solid particles from the solvent. Some few processes either eliminate the filter or place it in the return line to the machine. Most plants also have a distillation apparatus associated with the storage system so that the solvent can be periodically distilled to remove oils, etc. It is a matter of preference, but the general procedure is to distill 10 to 20% of the solvent used in a day's operation each day, thus maintaining an acceptable level of fatty acids and dissolved matter in the solvent used for cleaning by removing daily some of these materials. The distillation of the dirty solvent removes the fatty acids, soluble oils, other soluble matter including the additives such as detergents, hand agents, sweeteners, etc. This removal necessitates the replenishment of the additives. They are troublesome to add because they must be added within limits, and often addition causes minor fluctuations in cleaning. It is to avoid the necessity of the operator of having to measure, test, etc., that the present invention is directed.

BRIEF SUMMARY OF INVENTION

According to the present invention, a dry cleaning plant operated in the following manner, will establish a consistent cleaning routine from day to day, week to week and even year to year. These advantages are accomplished by the addition of a single fluid in amounts only equal to the solvent losses occasioned by normal operation. The process comprises adding to a conventional dry cleaning apparatus a cleaning fluid consisting of a dry cleaning solvent (as hereinafter defined) from *0.25* [0.001] to *15* [5]% by weight of a detergent system consisting of from *5* [30] to *90* [70]% by weight of a mono or di, or mixture of mono and di hydrocarbyl polyethylene glycol esters of ortho phosphoric acid, from *95* [70] to *10* [30]% by weight of an alkyl phenoxypolyoxyalkylene ethanol, and 0.001 to 10% of phosphoric acid or its alkali metal or alkaline earth metal salts, cleaning soiled articles to remove the soil and dissolve the oils, fatty acids, etc., into the solvent and suspend the solid particulate matter in the solvent, removing the solid particulate matter by filtration of the soiled solvent, *periodically between additions of solvent*, distilling *at least about* a *5* [10 to 20]% aliquot of the [filtered soiled] solvent to remove the fatty acids, oils, etc., returning the so-distilled solvent to the cleaning cycle [with soiled but filtered] solvent, and maintaining a constant volume of solvent in the system by adding aliquots of said cleaning fluid to said system, thereby establishing within the acceptable limits of the good cleaning of the most carefully controlled plant.

The measure of effectiveness of an operation carried out in accordance with the present invention is the brightness of articles cleaned compared to standards. This property is a measure of cleaning (soil removal) and anti-redeposition properties. The presence or absence of odor is a measure of fatty acid removal, buffering, or neutralization. The hand of the garment is a measure of acceptability of the process to the public.

The present process operates most effectively by employing a dry cleaning fluid consisting essentially of a dry cleaning solvent, a phosphate ester anionic surfactant *which can contain phosphoric acid or its alkali metal or alkaline earth metal salts* and a nonionic surfactant, *which may also be present in the anionic surfactant as manufactured.* The surfactants are to be employed in amounts of from 0.25 to 15% by weight of the solvent. The proportion of anionic to non-ionic surfactant is from 5 to 90 weight percent of the total weight of the detergent system of the former to 95 to 10 weight percent of the latter. It has been found preferable to employ between 30% and 80% anionic surfactant based on the total surfactants composition for optimum results when using with the non-aqueous solvents such as the halogenated hydrocarbon solvents having from 1 to 4 carbon atoms, e.g., perchloroethylene. It has also been found desirable and economical to use from about 0.25 to 4% by weight of the total surfactants to halogenated hydrocarbon solvent.

The class of phosphate esters which have been successfully employed to give the improved results has the general formula

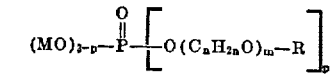

wherein n represents an integer from 2 to 4; m represents an integer from *1* [0] to 12; p represents an integer from 1 to 2; R represents a radical selected from the group consisting of [hydrogen,] alkyl, phenyl, alkylphenyl, and arylphenyl, said alkyl moieties having from 1 to 20 carbon atoms, and [when R is hydrogen, m is at least 1, and when m is 0, R is a carbon chain of at least 4 carbon atoms and,] M being hydrogen or a (water-soluble) salt-forming cation such as sodium, potassium, ammonium or the like. The phosphate esters can be prepared in any of the well-known manners, such as described, for example, in U.S. Patent No. 3,004,056, or Kosalapoff, G. A. "Organophosphorous Compounds," John Wiley and Sons, Inc., New York (1950). A particularly suitable class of phosphates falling within the class above set forth are those phosphate esters having the following formulas:

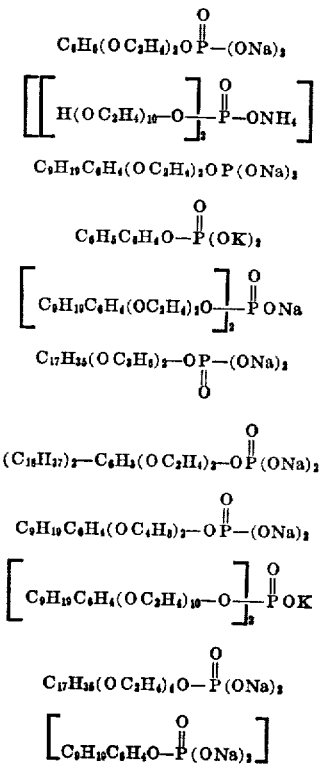

in addition to those others adequately described in U.S. Patent No. 3,004,056.

*As disclosed in this patent, the phosphate ester detergent can contain inherently for many purposes sufficient quantities of inorganic phosphate component and nonionic detergent component.*

The non-ionic surfactive materials which are employed are principally the alkylphenoxy polyalkeneoxy alkanols. The materials have the generic formula

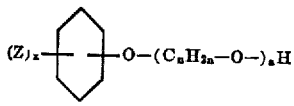

wherein n represents an integer from 2 to 4; a represents an integer from 2 to about 40; x is an integer from 1 to 2; and, Z represents an alkyl radical having from 4 to 20 carbon atoms.

Suitable surfactants falling within the class of nonethanol, butylphenoxy tetra(ethoxy)ethanol, cosylphenoxyoctadeca(ethoxy)ethanol and the like.

In order to evaluate the effectiveness of the present invention as dry cleaning process, carbon soil removal tests and redeposition tests were conducted. One series of tests comprised washing an artificially soiled swatch of cloth together with a clean white cloth in a Launder-O-Meter using various surfactants in perchloroethylene to determine soil removal from the soiled cloth and redeposition on the clean cloth. In another series of tests, an artificial soil load was added to the perchloroethylene detergent system and clean cloth swatches washed to determine soil pick-up, thus measuring anti-redeposition properties of the detergent system.

The following examples illustrates the present invention but are not to be construed as limiting.

EXAMPLE 1

Test A.—Carbon soil removal

Carbon soil removal data were obtained by washing a 2-inch x 4-inch rectangular swatch of artificially soiled wool (Standard cloth by Foster D. Snell) in a Launder-O-Meter. The Launder-O-Meter jar was filled with 300 ml. of perchloroethylene, and 1.0 weight percent of a surfactant system, e.g., surfactant A or surfactant A+B, based on the perchloroethylene, added. The artificially soiled wool cloth was introduced into the jar and then agitated for 15 minutes while the temperature was maintained at about 80° F. The cloth was removed, squeezed gently to express excess solvent and hung up to dry. The efficiency of the surfactant to remove soil was determined by the light reflectance of the washed cloth. If the washed cloth had a reflectance greater than the soiled cloth, there was carbon soil removal. The reflectance test was set up by first scanning an unsoiled wool cloth supplied by the manufacturer, Foster D. Snell, with a 610 Photovolt meter and setting the 100 reading for the average of the scan. The zero setting was obtained by scanning the artificially soiled cloth before the washing test. The meter on scanning the washed cloth then gives the percent of soil removed. The various systems within the scope of the present invention were compared with a system of the same anionic surfactant. The effectiveness of the present systems over the anionic alone is shown in the Table I as percent change, the negative sign indicating less soil removal and the plus sign indicating greater soil removal of the two component system over the single anionic. The data for the systems of the present invention (the first two series of data) is compared with the data for a commercially used anionic (the last series of data). It is clearly seen that there is less change in soil removal when a nonionic "hand" improver is added to the anionic detergent of the present invention than when the nonionic agent is added to conventional anionic detergents. The percent change was obtained according to the following calculation:

$$\text{percent change} = \frac{\text{(reading at 0.7\% or 0.3\% anionic plus nonionic) minus reading at 1.0\% anionic alone}}{\text{reading at 1.0\% anionic}}$$

Redeposition

The evaluation of the detergent compositions' ability to prevent deposition of the soil onto the cleaned cloth was conducted by washing, simultaneously, with a soiled wool swatch, a 2-inch x 4-inch clean wool gabardine swatch and using a measurement of the decrease in light reflectance of the gabardine after washing as an indication of redeposition. The light reflectance before washing, 100 setting on a model 610 search unit Photovolt meter with a No. 98 green-blue tri-stimulus filter, was obtained by scanning both sides of the unwashed swatches after zero setting the meter by full clockwise rotation of the zero set meter dials.

The results of these tests are set forth in the table below under Test A with the data being reported in the same manner as that for the soil removal test. This test series substantiates that the phosphate esters maintain cleaning ability and anti-redeposition properties when mixed with an nonionic material which is a "hand" agent.

TABLE I.—TEST A

| Surfactant [1] | Carbon soil removal properties, percent change | Anti-redeposition properties, percent change |
|---|---|---|
| I, 0.7; II, 0.3 | −4.76 | −3.0 |
| I, 0.3; II, 0.7 | −21.3 | −6.6 |
| III, 0.7; II, 0.3 | +50.0 | −1.08 |
| III, 0.3; II, 0.7 | +42.5 | −3.24 |
| Control | | |
| IV, 0.7; II, 0.3 | −51.5 | −20.5 |
| IV, 0.3; II, 0.7 | −39.0 | −15.5 |

[1 I, Sodium bis[hydroxy-terra(oxyethyl)] phosphate; II, Nonylphenoxy octaethoxy ethanol; III, Sodium bis[hydroxy-nona(oxyethyl)]phosphate; IV, Petroleum sulfonate.]

[1 *I, Sodium bis[nonylphenyl-tetra(oxyethyl)]phosphate; II, Nonylphenoxy octaethoxy ethanol; III, Sodium bis[nonylphenyl-nona(oxyethyl)]phosphate; IV, Petroleum sulfonate.*

Test B

Another series of tests was employed to obtain additional data for the anti-redeposition properties as related to artificially soil-loaded solvent systems on clean cloth swatches.

Data were obtained by washing a clean 2-inch x 4-inch wool gabardine and a clean 2-inch x 4-inch cotton No. 400 swatch in a Launder-O-Meter. The Launder-O-Meter jar was filled with 300 ml. of perchloroethylene and 1.0 weight percent of surfactant based on the perchloroethylene, and 0.3 gram of vacuum cleaner soil was added. The 2-inch x 4-inch wool and cotton swatches were introduced into the jar and agitated for 20 minutes while maintaining the temperature at about 80° F. The swatches were removed, squeezed gently to express excess solvent and hung up to dry. Comparison was made by repeating these steps using various other detergent systems both within and without the present invention.

The evaluation of the detergent composition's ability to prevent redeposition of the soil was based on calculations obtained by measuring the decrease in light reflectance of each swatch after washing. The light reflectance before washing, 100 setting on a model 610 search unit Photovolt meter with a No. 98 green-blue tri-stimulus filter, was obtained by scanning both sides of the clean swatches before washing, after zero setting the meter by full clockwise rotation of the zero set meter dials. The data are reported in Table II in the same manner as the soil removal test data described above in Test A.

TABLE II.—TEST B

[Anti-Redeposition Properties]

| Surfactant [1] | Cotton No. 400 Percent Change | Worsted Gabardine Percent Change |
|---|---|---|
| I, 0.7; II, 0.3 | −0 625 | +0.56 |
| I, 0.3; II, 0.7 | +0.625 | −1.68 |
| III, 0.7; II, 0.3 | +1.6 | −2.57 |
| III, 0.3; II, 0.7 | −2.15 | −2.06 |
| Control | | |
| IV, 0.7; II, 0.3 | −6.7 | −13.5 |
| IV, 0.3; II, 0.7 | −9.2 | −3.25 |

[1 I, Sodium bis[hydroxy-tetra(oxyethyl)]phosphate; II, Nonylphenoxy octaethoxy ethanol; III, Sodium bis[hydroxy-nona(oxyethyl)]phosphate; IV, Petroleum sulfonate.]

[1 *I, Sodium bis[nonylphenyl-tetra(oxyethyl)]phosphate; II, Nonylphenoxy octaethoxy ethanol; III, Sodium bis[nonylphenyl-nona(oxyethyl)] phosphate; IV, Petroleum sulfonate.*

Having developed by laboratory testing that the cleaning fluid will give superior results over present day known dry cleaning detergent-hand agent systems, the following test was run to determine the effectiveness of the cleaning fluid to remain sweet, that is without odor, in stage and use.

In actual field test wherein a commercial dry cleaning solvent containing a phosphate detergent and having its moisture content maintained below about 1%, the presence of 0.001% phosphoric acid, but which process did not employ commercial sweetener powder, has maintained the solvent free of odors for over one year. The cleaning fluid employed in the field test was:

| | Weight percent |
|---|---|
| Phosphate ester of tridecylalcohol ethoxylate | 2.0 |
| $H_3PO_4$ | 0.005 |
| $H_2O$ | 0.010 |
| Perchloroethylene, q.s. | |

The procedure employed by the dry cleaner was to pass the solvent from the wash wheel to the filter, then to the storage tank, removing ten (10) percent each day from the storage tank to a small continuous still.

The addition of the above-listed cleaning composition once a week to bring the solvent level in the storage tank to a predetermined level was practiced. In a comparative test conducted with the same solvent containing no phosphoric acid or phosphate ester but employing a conventional dry cleaning detergent, hand agent and commercial sweetener powders, the sweeteners were added from time to time, to maintain the solvent in the same odor-free condition. When, however, the sweetener was added from time to time, the filter pressure built up, necessitating shut down and cleaning of the filters. Further, the detergent had to be augmented from time to time as its level dropped several times a week below that recommended by the manufacturers.

It was also observed during the field tests wherein articles of clothing were cleaned in the commercial dry cleaning establishment that consistent good quality cleaning was obtained when the process was operated in accordance with the present invention. On the other hand, using the conventional technique and conventional additive filter plug-up, detergent level and hand agent level drop off necessitated constant attention by the cleaner including frequent back washes, additions of detergent and hand agents, sweetening powders and greater quantities of cleaning fluid distilled to maintain the solvent relative humidity at about 75% to prevent shrinkage. Further, the cleaning quality was not consistent. The cleaner frequently had to reclean garments or treat them specially to remove soil and give the garment a good hand.

I claim:

1. In a method of dry cleaning by contacting sequentially loads of dirt-contaminated articles with a dry cleaning solvent which contains surface-active agents to assist in the removal of the dirt from the article and suspension thereof in the dry cleaning solvent, which dry cleaning solvent normally requires sweeteners to prevent odor developing, and to control the fatty acids dissolved in the dry cleaning solvent, the improvement which comprises:

(1) contacting the dirt-contaminated articles with a dry cleaning solvent composition containing from 0.25 to about 15% by weight of a mixture *consisting essentially* of (A) from 5 to 90% by weight of a first surface-active agent consisting of at least one ester of orthophosphoric acid having the formula $$(MO)_{3-p}-\overset{O}{\overset{\|}{P}}-\left(O-\left(C_nH_{2n}O\right)_m-R\right)_p$$

wherein M represents a member selected from the group consisting of hydrogen or a water-soluble salt forming cation selected from the group consisting of Na, K or $[NH_3]NH_4$, each R represents a radical independently selected from the group consisting of [hydrogen,] alkyl, phenyl, alkylphenyl and arylphenyl, said alkyl moieties having from 1 to 20 carbon atoms, n represents an integer from 2 to 4, m an integer from *1* [0] to 12, and p represents and integer from 1 to 2, and (B) from 95 to 10% by weight of a second surface-active agent consisting of an alkylphenoxy polyalkeneoxy alkanol having the generic formula

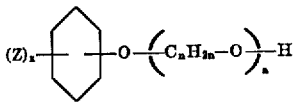

wherein n represents an integer from 2 to 4; a represents an integer from 2 to about 40; x is an integer from 1 to 2; and Z represents an alkyl radical having from 4 to 20 carbon atoms, and (C) 0.001 to 10% by weight phosphoric acid or its alkali metal or alkaline earth metal salts, periodically (2)(*a*) distilling at least about 5% by weight of said dry cleaning solvent and surfactant mixture containing suspended dirt, [(3)](*b*) returning the surfactant-free dry cleaning solvent condensate to the contacting step, and

[(4)](*3*) periodically replenishing with make-up dry cleaning solvent containing surfactant dissolved in the concentration originally employed therein, thereby to establish a minimum continuing level of surfactant and phosphoric acid *or its salts* sufficient to maintain a constant cleaning level.

2. In the method of claim 1 wherein said dry cleaning solvent composition contains from 0.25 to about 4% by weight of the mixture.

3. In a method for dry cleaning wherein a dry cleaning solvent containing detergent, hand agents and acidity control agents is employed to wash articles, the dry cleaning solvent and its additives are filtered and periodically distilled to remove contaminates such as dirt particles, dyes, fatty acids, and wherein the additives are depleted during the cleaning of the article, the filtration and the distillation and the solvent is lost to the ambient atmosphere and during distillation, the improvement which comprises initially introducing a dry cleaning solvent composition which contains the necessary ingredients to clean the articles, to maintain the acidity of the dry cleaning solvent composition at a level to prevent odor and to permit withdrawal of the articles with a desirable hand, said composition consisting essentially of a dry cleaning solvent, 0.25 to 15% by weight of a dry cleaning detergent consisting of from 5 to 90% by weight of at least one ester of orthophosphoric acid having the formula

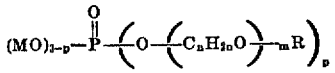

wherein M represents a member selected from the group consisting of hydrogen or a water-soluble salt forming cation selected from the group consisting of Na, K or $NH_4$, each R represents a radical independently selected from the group consisting of [hydrogen,] alkyl, phenyl, alkylphenyl and arylphenyl, said alkyl moieties having from 1 to 20 carbon atoms, n represents an integer from 2 to 4, m an integer from *1* [0] to 12, and *p* represents an integer from 1 to 2; and from 95 to 10% by weight of a nonionic dry cleaning surfactant and 0.001 to 10% by weight of phosphoric acid or its alkali metal or alkaline earth metal salts;

*periodically:* filtering the dry cleaning solvent composition;

[periodically] distilling at least about five percent of the dry cleaning solvent composition [in the system];

returning additive-free dry cleaning solvent to the process; and adding the same dry cleaning solvent composition to the process when make-up is required, thereby to maintain by a single periodic addition all the necessary ingredients to provide a uniform efficacious cleaning of articles.

References Cited

The following references, cited by the Examiner, are of record in the patented file of this patent or the original patent.

UNITED STATES PATENTS

| | | | |
|---|---|---|---|
| 2,941,952 | 6/1960 | Lewis et al. | 252—161 X |
| 3,091,508 | 5/1963 | Edwards | 8—142 |
| 3,117,152 | 1/1964 | Michaels | 260—471 X |

MAYER WEINBLATT, Primary Examiner

U.S. Cl. X.R.

8—137; 252—89, 153, 170, 171

PO-1050
(5/69)

UNITED STATES PATENT OFFICE
CERTIFICATE OF CORRECTION

Patent No. RE 28,014 Dated May 21, 1974

Inventor(s) Herman Knieriem, Jr.

It is certified that error appears in the above-identified patent and that said Letters Patent are hereby corrected as shown below:

Col. 1, line 26, delete "compositions" and insert --composition--.

Col. 1, line 58, delete "relates" and insert --rotates--.

Col. 2, line 65, delete "surfactants" and insert --surfactant--.

Col. 3, between lines 73 and 74 insert --ionics above outlined are nonylphenoxy octa(ethoxy)- --

Col. 5, Table II, under the heading "Cotton No. 400 Percent Change", delete "-0 625" and insert -- -0.625--.

Signed and sealed this 17th day of September 1974.

(SEAL)
Attest:

McCOY M. GIBSON JR.
Attesting Officer

C. MARSHALL DANN
Commissioner of Patents